United States Patent
Wei

[11] Patent Number: 5,842,683
[45] Date of Patent: Dec. 1, 1998

[54] STRUCTURE OF A BALL VALVE ESPECIALLY USED IN FOOD PROCESSING

[75] Inventor: J. J. Wei, Taipei Hsien, Taiwan

[73] Assignee: Upsoon Industrial Co., Ltd., Taipei Hsien, Taiwan

[21] Appl. No.: 834,893

[22] Filed: Apr. 7, 1997

[51] Int. Cl.⁶ ..................................................... F16K 5/06
[52] U.S. Cl. ..................... 251/315.13; 137/240
[58] Field of Search ......................... 137/240; 251/315.13

[56] References Cited

U.S. PATENT DOCUMENTS

| | | | |
|---|---|---|---|
| 2,031,151 | 2/1936 | Ebberg | 137/240 X |
| 3,380,707 | 4/1968 | Scaramucci | 251/315.13 X |
| 4,203,460 | 5/1980 | Priese | 137/240 |
| 4,552,334 | 11/1985 | Tomijarra et al. | 137/240 |

FOREIGN PATENT DOCUMENTS 3 503 030   7/1986   Germany ............................... 137/240

*Primary Examiner*—John Fox
*Attorney, Agent, or Firm*—Bacon & Thomas

[57] ABSTRACT

The present invention is related to an improved structure of a ball valve especially used in food, said ball valve is a hollow valve body. A ball shape gate having penetrating channel is installed on the hollow crossing portion of said valve body. A rotary buckle groove is a installed on the upper end of said ball shape gate. A rotary handle has a buckle plate which is projected to the hollow crossing portion of the valve body, they are engaged to combine with said groove so presented as an actuating portion for controlling the rotation of said ball shape gate, as well as the openings on the right and left rim end of said valve body are installed with a drain preventing pad and seal ring, respectively, and then the axle tube is combined on the left and right openings for screwedly combining to form as a integral body, as the ball valve are assembled, the characterized in that:

said valve body has an hollow crossing portion which is designed with a tilting surface with a proper tilting angle, and the interface is adjacent with the center of the valve body so that the center portion of said valve is a concave drain tank, and on the tilted upper side and lower side are installed with a gas (or water) inlet and a gas (water) output, respectively, which are penetrated through said drain tank, thus, the cleaning of said ball valve may be performed by introducing or draining vapor.

2 Claims, 4 Drawing Sheets

STRUCTURE OF A BALL VALVE ESPECIALLY USED IN FOOD PROCESSING

BACKGROUND OF THE INVENTION

1. Field of the Invention

The present invention is related to an improved structure of a ball valve especially used in food, particularly, to a ball valve which is widely used in food finishing industry for controlling the output and input of material, so that after improving, the cleaning work within said ball valve may be performed by introducing high pressure vapor or water and then by the control of an guiding tilting surface, the gas or (water) may automatically drain out from an gas outlet so to improve the effect of cleaning work.

2. Description of the Prior Art

The food ball valve in the prior art has generally a hollow valve body the left and right side of which are installed with openings and a ball valve being received within said inner flowing path and freely rotating. The left and right opening portions are combined with the left and right cylindrical connecting portions, by using bolts, said valve body and said left and right cylindrical connecting portions is assembled to form a body which may be freely attached and detached.

However, in the prior hollow valve structure, the characteristic of the arranged inner flow path is an equal diameter channel, while said ball valve is received within said inner flow path of said valve body, there are seals filled with sealing pad on the two side edges of said ball valve, in the prior art, the seal is a ball valve body, but the inner flow channel of the structure of said valve body disclosed in advance has an through hole of equal diameter. Although under said valve body a drain hole which is penetrated through said receiving portion of said ball valve is installed for draining liquid after cleaning, the inner flowing path of said valve is an equal diameter channel, thus any liquid within said valve could not be drained completely, and there are some residue and impurities are left within said valve, therefore, it is possible that the any liquid or object become rotten. This is the first defect of the prior art.

Meanwhile, although there are a drain hole installed on the lower portion thereof, thus it is obvious that the output will seal firstly, and then the cleaning water is filled from the inlet, therefore, since the outlet has been sealed, this induces that the water level within said valve will rise and then the wall of said valve will be soaked by the water, during cleaning, the water will not flow quickly, as consequence, the cleaning effect are greatly reduced. This is the second defect of the prior art.

SUMMARY OF THE INVENTION

Accordingly, the main object of the present invention is to provide an improved structure of a ball valve especially used in food, in which the inner wall of said ball valve may be cleaned effectively, and the ball valve may be easily manufactured.

Therefore, an further object of the present invention is to provide an improved structure of a ball valve especially used in food, within said valve the cleaning work may be easily performed.

In order to attain said objects, the improved structure of a ball valve especially used in food of the present invention is a hollow valve body. A ball shape gate having penetrating channel is installed on the hollow crossing portion of said valve body. A rotary buckling groove is installed on the upper end of said ball shape gate. A rotary handle has a buckling plate which is projected to the hollow crossing portion of the valve body, they are engaged to combine said groove as an actuated portion for controlling the rotation of said ball shape gate, as well as the openings on the right and left rim end of said valve body are installed with a drain preventing pad and seal ring, respectively, and then the axle tube is combined on the left and right openings for screwedly combining to form as a integral body, wherein said valve body has a hollow crossing portion which is designed with a tilting surface with a proper tilting angle, and the interface is adjacent with the center of the valve body so that the center portion of said valve is a concave drain tank, and on the tilted upper side and lower side are installed with a gas (or water) inlet and a gas (water) output, respectively, which are penetrated through said drain tank, in general, the inlet and the outlet are sealed by screwed locked covers. As the inside of said ball valve may be cleaned, the two screws are detached in order to introduce said vapor (or water) into said gas (water) inlet so that the introduced vapor may flow to form an eddy current between said ball valve body and inner wall of said valve, thus it may be cleaned completely. The residue and impurity within said valve may gradually flow into said drain tank through a tilting surface installed in the present invention, and furthermore to drain out through said gas (water) outlet, thus the cleaning work within said food ball valve may be completely performed through the introducing and draining of gas and water through said inlet and outlet.

The invention, as well as its many advantages, may be further understood by the following description and drawings in which:

DETAILED DESCRIPTION OF THE PREFERRED EMBODIMENT

Figure 1:
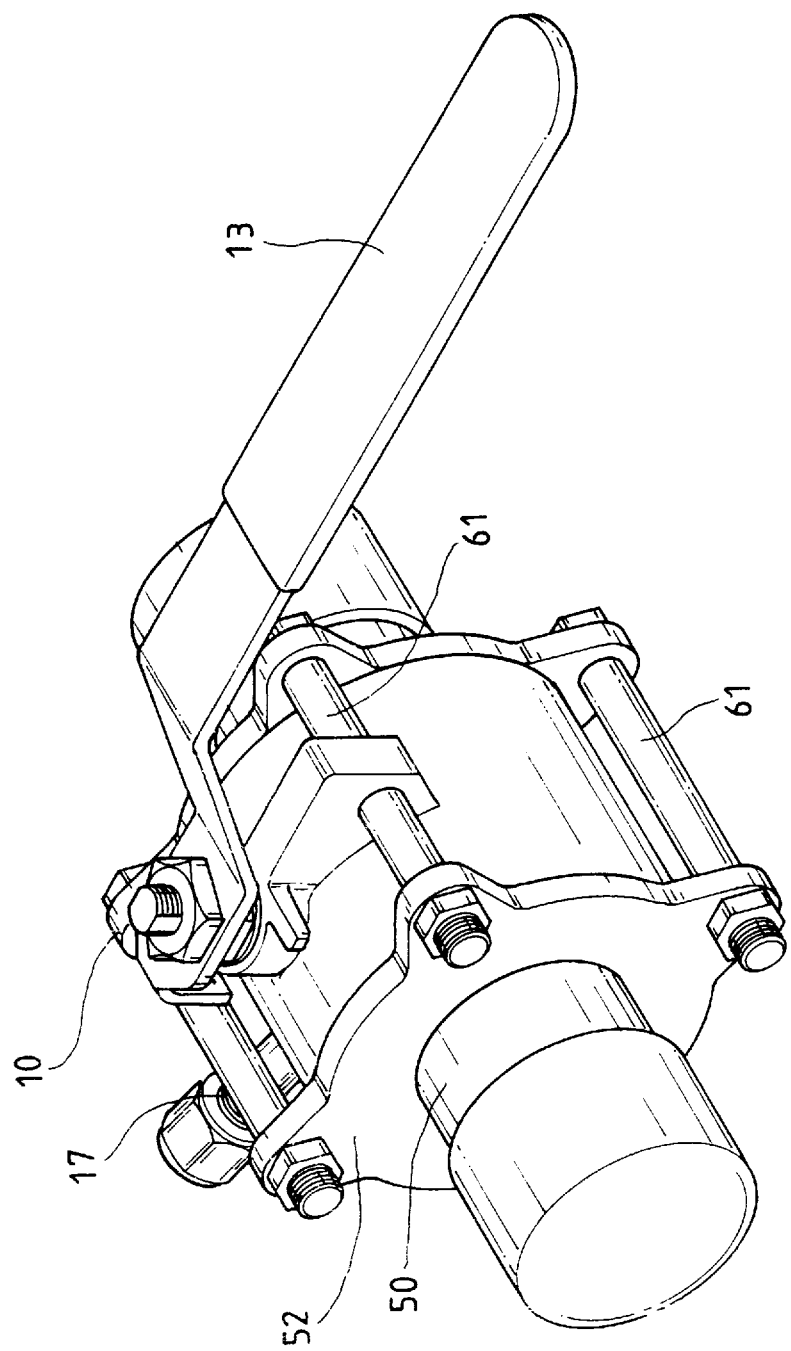
FIG. 1 shows the appearance of the embodiment of the present invention.
Figure 2:
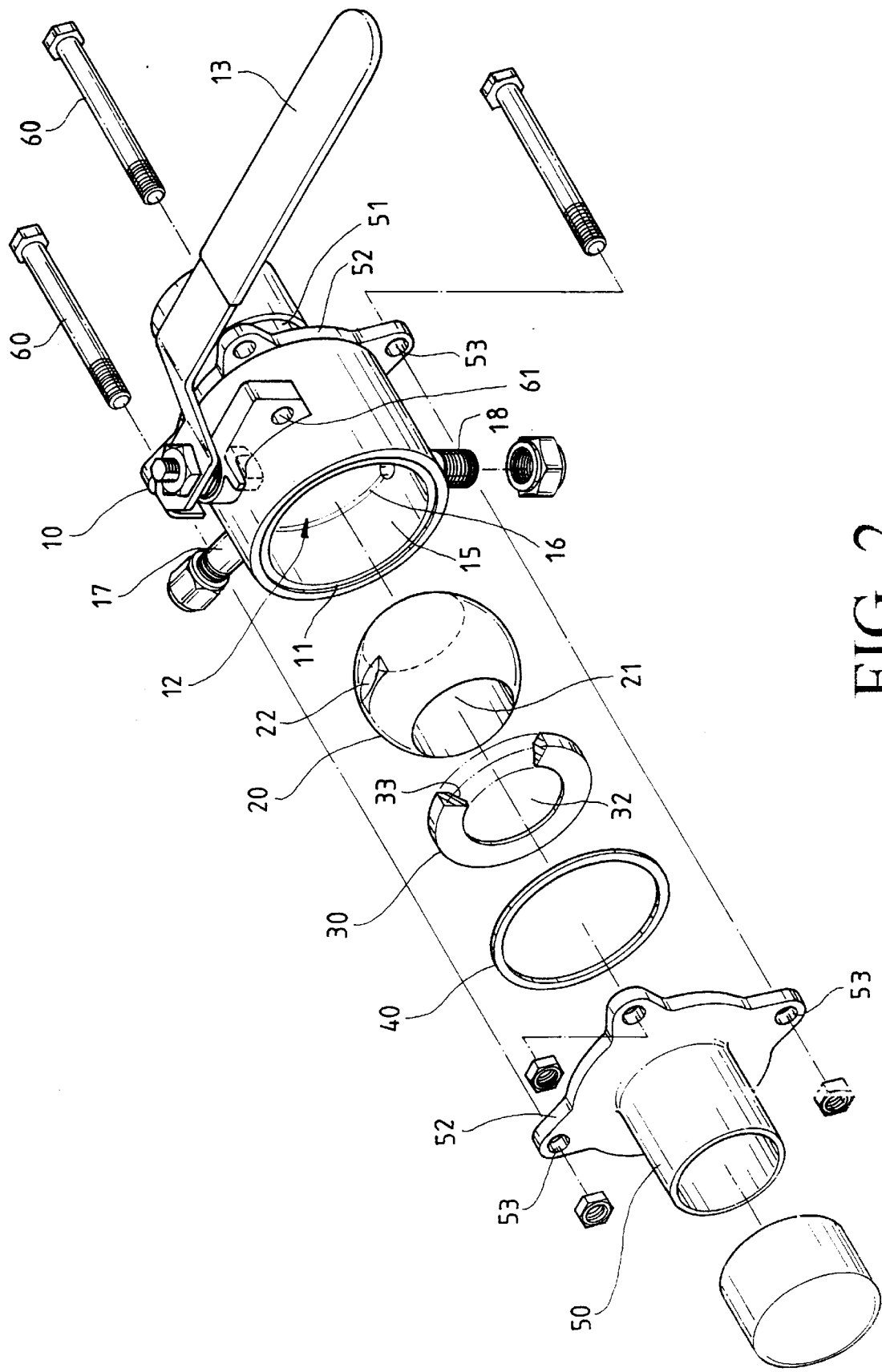
FIG. 2 shows the structural exploded view of the embodiment of the present invention.
Figure 3:
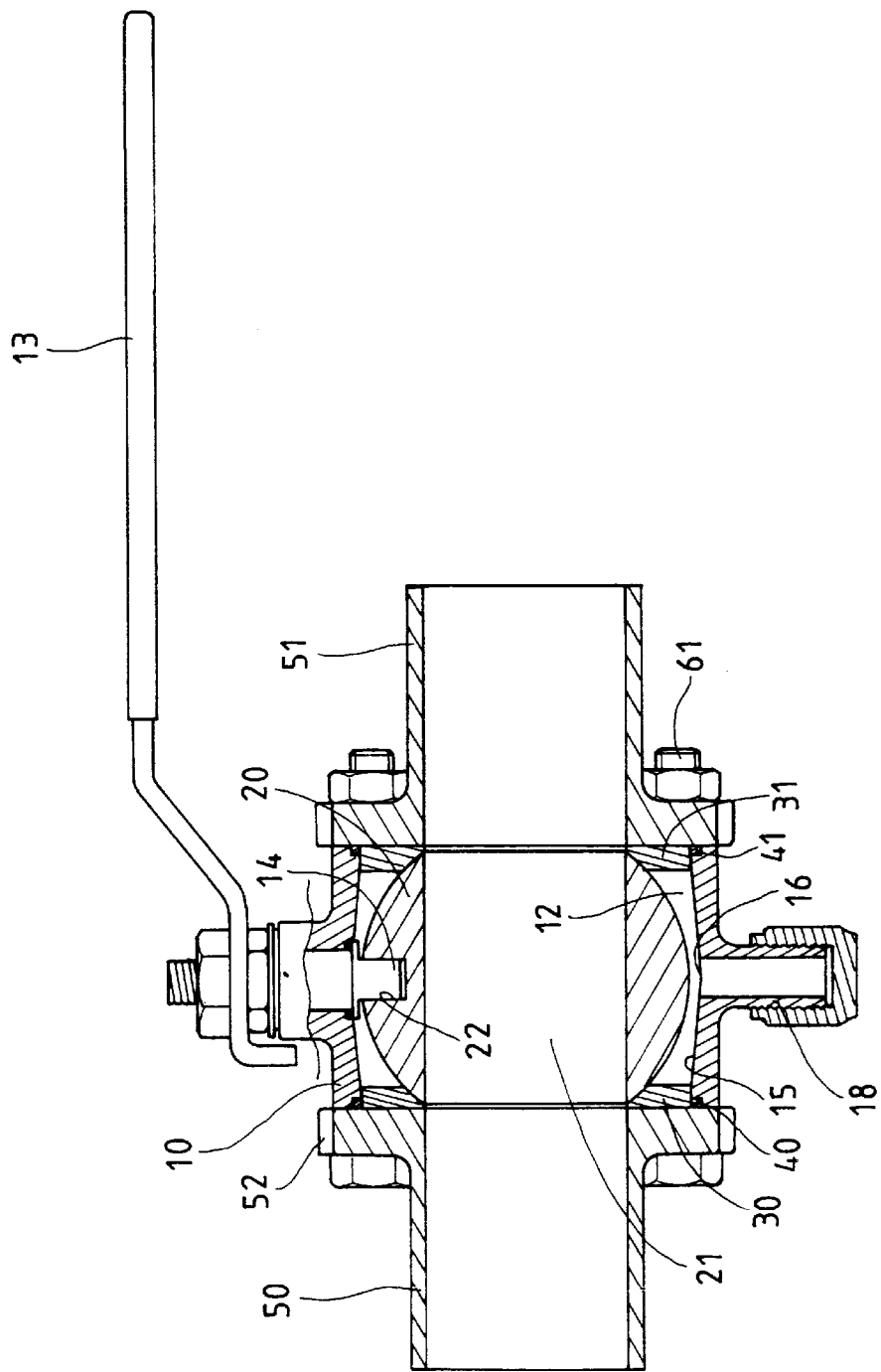
FIG. 3 shows the lateral cross section view of the embodiment of the present invention in the axial direction.
Figure 4:
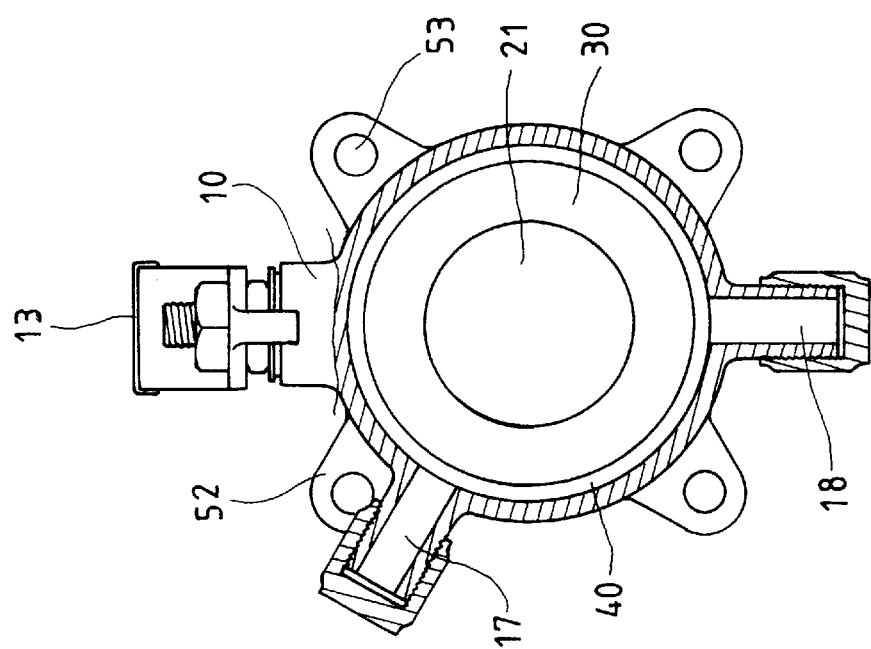
FIG. 4 shows the lateral cross section view of the embodiment of the present invention in the radial direction.

Now referring to FIG. 1,2, and 3, it shown an improved structure of a ball valve especially used in food in the embodiment of the present invention, the ball valve is comprised of a valve body 10, a ball shape gate 20, two drain preventing pads 30 and 31, two sealing rings 40, 41 and left and right axle tubes 51 and 51, etc., wherein Said valve body 10 has right and left opens 11, and an inner section 12 so to present with a hollow flowing channel, a rotating handle 13 is installed on the top end of said buckle valve body 10, and said rotating handle 13 is downwards extended to connect with a buckle plate 14 which is projected from the hollow inner portion 12. The inner wall of the crossing portion of valve body 10 is installed with a proper tilted slope 15 which is located on the openings 11, the interface is adjacent with the center of the valve body 10 so that the center portion of said valve is a concave drain tank 16, and on the tilted upper side and lower side are installed with a gas (or water) inlet 16 and a gas (water) output 18, respectively, which are penetrated through said drain tank 16. In general, the inlet and the outlet are sealed by screwed locked covers 19.

Said ball shape gate 20 has a inner flowing channel 21 the upper end of which is installed with a groove 22 for engaging with a buckle plate.

The two right and left drain preventing pads 30 and 31 are installed with inner holes 32 the diameters of which are the same as that of the inner flowing channel 21 within said ball valve, and contacting rings 33 are located near the ball shape gate.

The left and right seal rings 40 and 41 are ring pad bodies and the ring pad thereof may be used to enclose the outer diameter portion of said drain preventing portion;

The right and left axle tubes 50 and 51 are formed by a bottom plate 52 vertically combining with a connecting tube, further, a plurality of screwed fixing holes are symmetrically installed on the bottom plate thereof.

During assembling, the groove 22 of the ball shape gate 20 is engaged with the rotating handle 13 of said valve body and then it is extended downwards to project to the buckle plate 14 of said hollow crossing portion, thus, said ball body 20 may be rotated to shift position from outside by the rotating handle 13 to actuate the ball shape gate 20. Further, a drain preventing pad 30 (31) and seal ring 40 (41) is installed against the left and right rim ends of said valve body 20, i.e., on the left and right openings 11 of the valve body 10, and the bottom plate 52 is adhered on the left and right openings 11 of the valve body 10, then they are connected as a whole body by screws 6 (wherein a screw is penetrated through the screw hole 61 on the outside of the valve body) so to form as a valve body.

In summary, as comparing to the structure of hollow cross portion of the prior ball valve, in the the present invention, the wall surface within said valve is designed with a slope plane with a proper tilting angle, and they are connected on the inner tilted interface of the center. Assume the center of said valve has a concave drain tank, and there are penetrating holes installing respectively on the central bottom side and the tilting upper side so that the vapor flow is easily conducted into said body for cleaning the valve body. Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

DESCRIPTION FOR THE NUMBERS IN FIGS.

10 valve body
11 opening
12 inner crossing portion
13 rotating handle
14 buckle plate
15 tilting surface
16 drain tank
17 gas (water) inlet
18 gas (water) outlet
19 cover
20 ball shapew gate
21 inner flowing channel
22 groove
30,31 drain preventing pad
32 inner hole
33 contacting rim
40,41 seal ring
50 left axle tube
51 right axle tube
52 bottom plate
53 screwed fixing hole
60 screw
61 axle hole

What is claimed is:

1. A ball valve for use in food processing and comprising:
   a) a valve body forming a hollow flow channel having left and right openings through left and right sides of the valve body and communicating with the hollow flow channel, the left and right sides being substantially parallel to each other;
   b) a ball shape gate located in the valve body, the ball shape gate having an inner flowing channel therethrough and movable between an open position wherein the flowing channel permits fluid flow through the left and right openings, and a closed position wherein such fluid flow is prevented, an upper portion of the ball shape gate having a groove therein;
   c) a handle rotatably connected to the valve body and having a buckle plate extending into the valve body into engagement with the groove in the ball shape gate such that rotation of the handle moves the ball shape gate between the open and closed positions;
   d) left and right axial tubes affixed to left and right sides of the valve body in alignment with the left and right openings;
   e) seals located in contact with the valve body, ball shape gate, and left and right axial tubes;
   f) left and right sloped surfaces on an interior of the valve body sloping toward each other such that a lateral dimension of the interior of the valve body at a juncture of the left and right sloped surfaces is greater than a lateral dimension of the interior of the valve body at the left and right openings; and,
   g) an inlet and an outlet communicating with the interior of the valve body, the outlet being located at the juncture of the left and right sloped surfaces, the inlet and outlet having axes oriented obliquely to each other in a plane extending transversely across the valve body.

2. The ball valve as claimed in claim 1 wherein the included angle between the left and right sloped surfaces is at least 170°.

\* \* \* \* \*